Feb. 22, 1927.

D. L. McCLINTOCK

POWER TRANSMISSION FOR AUTOMOBILES

Filed Aug. 19, 1925   2 Sheets-Sheet 1

Inventor:
David L. McClintock

Feb. 22, 1927. 1,618,301
D. L. McCLINTOCK
POWER TRANSMISSION FOR AUTOMOBILES
Filed Aug. 19, 1925  2 Sheets-Sheet 2
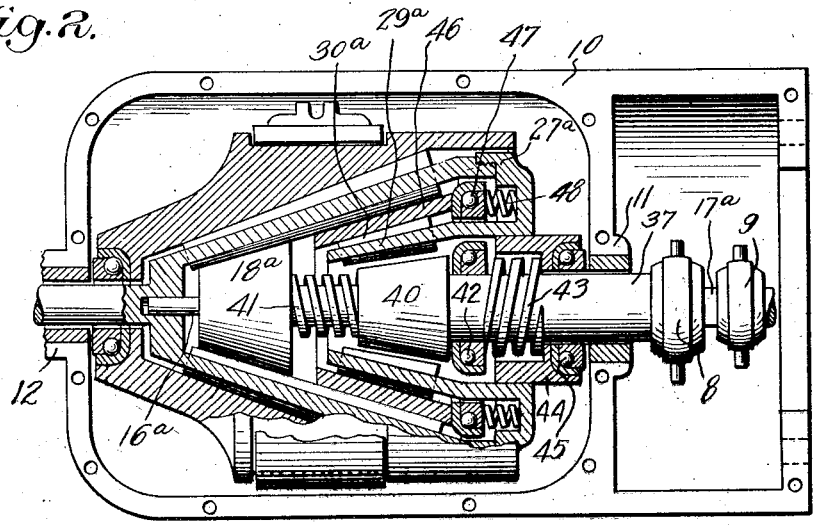
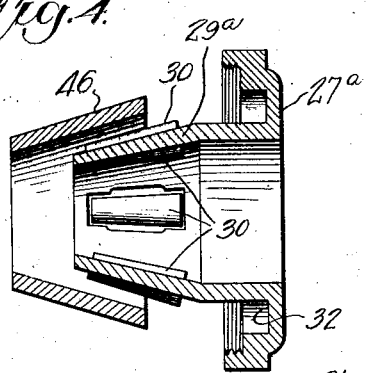
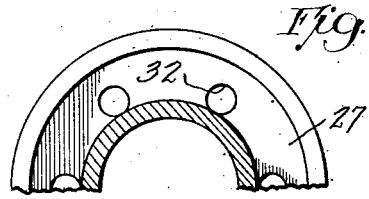
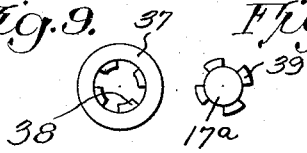
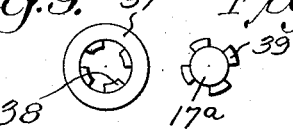
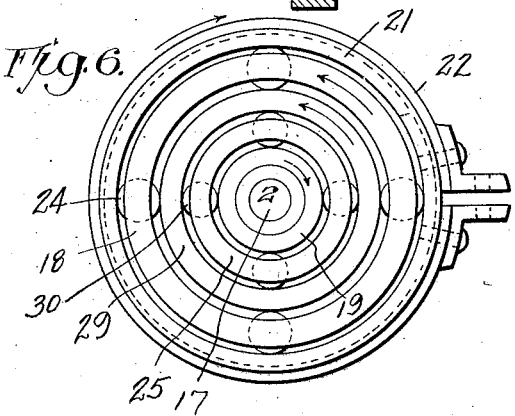
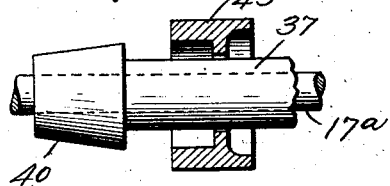
Inventor:
David L. McClintock Patented Feb. 22, 1927.

1,618,301

UNITED STATES PATENT OFFICE.

DAVID L. McCLINTOCK, OF PORTLAND, OREGON.

POWER TRANSMISSION FOR AUTOMOBILES.

Application filed August 19, 1925. Serial No. 51,189.

This invention relates to improvements in planetary transmissions and has for an important object thereof the provision of a device of this character which may be very compactly constructed, which will be durable and efficient in service and which may be readily assembled.

A further object of the invention is to produce a device of this character for employing rollers as a transmission means, certain of the rollers being employed in both forward and reverse speeds of the transmission.

A still further object of the invention is to provide a construction such that control of the transmission, as regards reversal of direction of operation of the driven shaft, may be very readily accomplished.

A still further object of the invention is to provide a device of this character in which the control of direction of the driven shaft may be embodied either in a single control element or in dual control elements, as is found desirable.

These and other objects I attain by the construction shown in the accompanying drawings, wherein for the purpose of illustration is shown a preferred embodiment of my invention and wherein:—

Figure 2 is a similar section taken through a modified form of the transmission;

Figure 4 is a sectional view through the reversing cone of the transmission of Figure 2 removed therefrom;

Figure 6 is a similar view of the reverse driving mechanism of the transmission;

Figure 8 is a sectional view through the end bell of Figure 2;

Figure 9 is an end elevation of the reverse operating cone of Figure 2;

Figure 10 is an end elevation of the shaft upon which the cone is mounted;

Figure 11 is a detail view of the reversing cone, the shaft and the collar being employed to receive the thrust of the spring operating the reversing cone.

Figure 1:
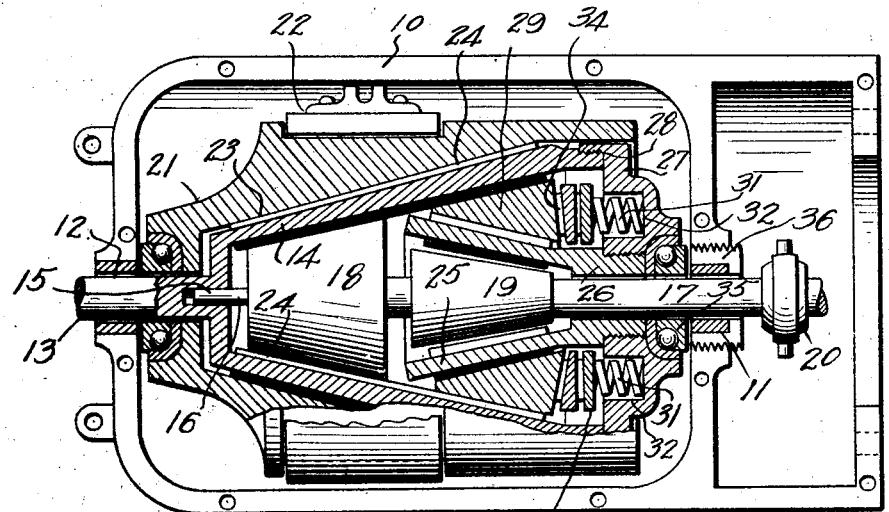
Figure 1 is a vertical sectional view through a transmission constructed in accordance with my invention.
Figure 3:
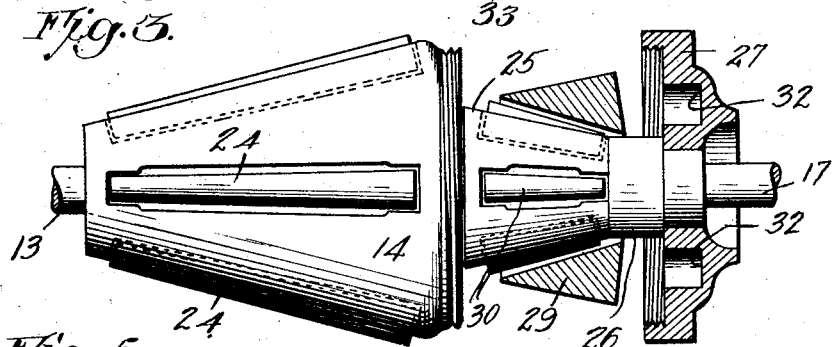
Figure 3 is a view showing the driving bell and certain of the operating parts of the transmission of Figure 1 removed therefrom to show the construction thereof.
Figure 5:
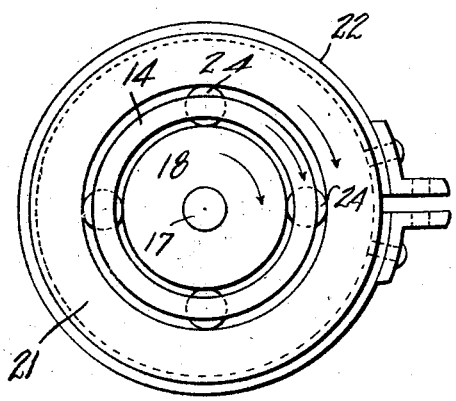
Figure 5 is a characteristic semi-diagrammatic view of the forward driving mechanism of the transmission.
Figure 7:
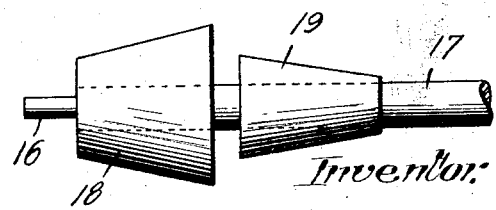
Figure 7 is a view of the control elements of the transmission of Figure 1.

Referring now more particularly to the drawings, the numeral 10 generally designates a transmission casing of any desired construction having spaced bearings 11 and 12 therein. In the form shown in Figure 1, the bearing 12 receives a driven shaft 13 which has a conical roller cage 14 arranged between the bearings 11 and 12. At the base of the cage and in the shaft 13 a bore 15 is formed, for the reception of a reduced end 16 of a driven shaft 17. Within the conical roller cage 14 at the smaller end of the roller cage, shaft 17 has secured thereto a driving cone 18 and at the larger end of the cage a second driving cone 19. The cone 18 is arranged upon the shaft 17 with its smaller end facing in the same direction as the smaller end of the roller cage 14, while the cone 19 is oppositely disposed upon the shaft 17. Any suitable means, such as a shifting collar 20, may be employed to shift the shaft 17 and its attached cones.

Surrounding the roller cage is a cylinder 21, the outer surface of which is adapted for coaction with a band brake 22 to prevent the rotation of the cylinder and the inner surface of which has a conical bore 23 receiving the roller cage. The roller cage 14 has mounted in the walls thereof longitudinally extending rollers 24 which are tapered from end to end and the surfaces of which project beyond the inner and outer surfaces of the roller cage.

Surrounding the cone 19 is a roller cage 25 similar to the roller cage 14 but considerably smaller. This roller cage has a hub portion 26 loosely mounted upon the shaft 17 and is threaded to an end bell 27, the periphery of which is engaged with the cage 14 at 28. Between the rollers of the cages 14 and 25 is arranged a ring 29, the outer face of which is tapered to fit the rollers of the cage 14 and the inner face of which is oppositely tapered to fit the rollers of the cage 25. This ring is kept in firm engagement with the rollers 24 and 30 by springs 31 seated in sockets 32 formed in the end bell 27 and engaging against a thrust collar 33 which, in turn, engages against the end 34 of the ring 29. Between the end bell 27 and bearing 11 a thrust collar 35 is preferably disposed and the bearing is preferably mounted in an adjustable section 36 of the transmission casing 10, so that wear may be taken up by adjustment of this section.

In the form of transmission shown in Figure 2, a slight modification is resorted to. The shaft 17ª, which corresponds to the shaft 17 of Figure 1, has but a single cone 18ª corresponding to the cone 18. Upon the shaft 17ª is mounted a sleeve 37, which sleeve and the shaft have coacting spline elements 38 and 39. The sleeve 37 is provided with a cone 40 facing in the same direction as the cone 18ª. Between the end of the sleeve 37 and the cone 18ª, a spring 41 surrounds the shaft 17ª, while the end of the cone 40 remote from the cone 18ª is abutted by a thrust collar 42 against which abuts one end of a spring 43 surrounding the sleeve 37 and having its opposite end abutted against a collar 44. This collar in turn abuts one face of a thrust bearing 45, the opposite face of which is abutted by the adjustable section 36 of the transmission casing. The end bell 27ª, which corresponds to the end bell 27 of Figure 1, has secured thereto a roller cage 29ª corresponding to the roller cage 29 of Figure 1, but oppositely arranged, so that its rollers 30ª will properly engage with the cone 40. Between the rollers 30ª of the cage 29ª and the rollers 24 of the cage 14, a conical ring 46 is arranged for engagement with the rollers 30ª and 24. As in the construction of Figure 1, this ring is urged toward the rollers by a thrust collar 47 pressed by springs 48 seated in sockets formed in the end bell 27ª. Each of the shafts 17ª and sleeve 37 are provided with shifting collars 49 controlling movement thereof.

In the operation of the transmission, as shown in Figure 1, if the shaft 17 is shifted toward the smaller end of the bell 14, the cone 18 comes into engagement with the rollers of the roller cage and imparts rotation thereto. If, at this time, the cylinder 21 is free to rotate, this cylinder will rotate and no rotation will be transmitted to the shaft 13. In order to transmit rotation, the brake 22 is tightened, checking the rotation of the cylinder 21, so that the rotation of the rollers 24 will cause the cage 14 and accordingly the shaft 13 to be rotated. To obtain the drive of the shaft 13 in the reverse direction, the shaft 17 is shifted, so that the cones move toward the larger end of the bell 14, with the result that the cone 19 comes into engagement with the rollers 30 of the cage 25, rotating the same. This rotation, as it may be determined by an inspection of Figure 6, will cause a reverse rotation of the ring 29, which is engaged with the rollers 24 of the cage 14. Accordingly, if the cylinder 21 is held against rotation, the cage 14 and shaft 13 will be reversely operated. The operation of the form of the invention shown in Figure 2 is exactly the same, with the exception of the fact that since the cone 40 is oppositely arranged and separate controls are provided for the cones 18ª and 40, these cones must be shifted in the same direction to obtain the forward and reverse operation of the shaft 13.

It will be obvious that a transmission of this character, eliminating as it does, the use of expensive gears, may be very readily and cheaply produced and an inspection of the drawings will render it obvious that the device may be very readily assembled. Furthermore, a transmission of this kind eliminates the use of a clutch, since it provides in the clutch and transmission a positive clutch which may be silently controlled by a suitable foot pedal or lever. The car embodying the transmission may be started, stopped or reversed at any speed of the motor without the necessity of shifting gears and accordingly the vehicle to which the device is applied is rendered much more flexible.

Since the construction hereinbefore set forth is capable of a certain range of change and modification without materially departing from the spirit of the invention, I do not limit myself to such specific structure except as hereinafter claimed.

I claim:—

1. In a transmission and in combination, a cylinder having a conical face and having a brake associated therewith for controlling rotation thereof, a conical cage having rollers projecting at opposite faces thereof and at one face thereof engaging the conical face of the cylinder, a pair of driven cones arranged for coaction with the opposite faces of the rollers of the cage, one of said cones directly engaging the rollers of the cage upon a predetermined movement of the cone, the other of said cones having associated therewith a second conical cage likewise having rollers projecting to opposite faces thereof, a ring disposed between the first and last named conical cages and having faces engaging the rollers of each thereof and means for shifting the other of said cones into engagement with the rollers of the last named cage.

2. In a transmission and in combination, a cylinder having a brake associated therewith for controlling rotation thereof, a cage having rollers projecting at opposite faces thereof and one face thereof engaging one face of the cylinder, a pair of driven elements arranged for coaction with the rollers of the cage at the opposite face of the cage, one of said elements directly engaging the rollers of the cage upon a predetermined movement thereof, the other of said elements having associated therewith a second cage likewise having rollers projecting to opposite faces thereof, a ring disposed between the first and last named cages and having faces engaging the rollers of each thereof and means for shifting the other of said elements into engagement with the rollers of the last named cage.

3. In a transmission and in combination, a cylinder having a conical face and having a brake associated therewith for controlling rotation thereof, a conical cage having rollers projecting at opposite faces thereof and at one face thereof engaging the conical face of the cylinder, a pair of driven cones arranged for coaction with the opposite faces of the rollers of the cage, one of said cones directly engaging the rollers of the cage upon a predetermined movement of the cone, the other of said cones having associated therewith a second conical cage likewise having rollers projecting to opposite faces thereof, a ring disposed between the first and last named conical cages and having faces engaging the rollers of each thereof, means for shifting the other of said cones into engagement with the rollers of the last named cage, the faces of said cages being arranged at an angle to one another and means for urging said ring into the angle between the cages to thereby insure proper engagement of the ring with the rollers.

4. In a transmission and in combination, a cylinder having a conical face and having a brake associated therewith for controlling rotation thereof, a conical cage having rollers projecting at opposite faces thereof and at one face thereof engaging the conical face of the cylinder, a pair of driven cones arranged for coaction with the opposite faces of the rollers of the cage, one of said cones directly engaging the rollers of the cage upon a predetermined movement of the cone, the other of said cones having associated therewith a second conical cage likewise having rollers projecting to opposite faces thereof, a ring disposed between the first and last named conical cages and having faces engaging the rollers of each thereof, means for shifting the other of said cones into engagement with the rollers of the last named cage, the faces of said cages being arranged at an angle to one another, means for urging said ring into the angle between the cages to thereby insure proper engagement of the ring with the rollers, there being an end bell connecting corresponding ends of said cages, the end bell having at its ring opposing face a plurality of sockets and springs in said sockets engaging said ring through a thrust collar.

5. In a transmission and in combination, a cylinder having a conical face and having a brake associated therewith for controlling rotation thereof, a conical cage having rollers projecting at opposite faces thereof and at one face thereof engaging the conical face of the cylinder, a pair of driven cones arranged for coaction with the opposite faces of the rollers of the cage, one of said cones directly engaging the rollers of the cage upon a predetermined movement of the cone, the other of said cones having associated therewith a second conical cage likewise having rollers projecting to opposite faces thereof, a ring disposed between the first and last named conical cages and having faces engaging the rollers of each thereof, means for shifting the other of said cones into engagement with the rollers of the last named cage and adjustable means for maintaining the rollers of the first named cage in engagement with the conical face of the cylinder.

6. In a transmission, a casing having spaced bearings, a conical cage having longitudinally extending rollers which project to opposite faces of the cage and extending longitudinally thereof arranged between said bearings, one end of the cage having a shaft extended into one of said bearings, a cylinder having a bore tapered to correspond to the taper of the conical cage surrounding the cage, a brake associated with the cylinder for controlling rotation thereof, the smaller end of the cage and the shaft having a bore, a second shaft rotatably mounted in the other of said bearings and having a reduced extension rotatable and slidable within said bore, a cone secured to said shaft and directly engageable with the rollers of the cage at the inner face of the cage, an end bell for the larger end of the cage, a second cage secured to said end bell and having rollers, said second cage projecting into the first cage, a ring disposed between the rollers of the first and second named cages and engaging each thereof and a second cone carried by said shaft and engageable with the rollers of the second cage to drive the same.

7. In a transmission, a casing having spaced bearings, a conical cage having longitudinally extending rollers which project to opposite faces of the cage and extending longitudinally thereof arranged between said bearings, one end of the cage having a shaft extended into one of said bearings, a cylinder having a bore tapered to correspond to the taper of the conical cage surrounding the cage, a brake associated with the cylinder for controlling rotation thereof, the smaller end of the cage and the shaft having a bore, a second shaft rotatably mounted in the other of said bearings and having a reduced extension rotatable and slidable within said bore, a cone secured to said shaft and directly engageable with the rollers of the cage at the inner face of the cage, an end bell for the larger end of the cage, a second cage secured to said end bell and having rollers, said second cage projecting into the first cage, a ring disposed between the rollers of the first and second named cages and engaging each thereof, a second cone carried by said shaft and engageable with the rollers of the second cage to drive the same and springs carried by said end bell and operatively engaging said ring to force the same into engagement with the rollers of said cages.

8. In a transmission, a casing having spaced bearings, a conical cage having longitudinally extending rollers which project to opposite faces of the cage and extending longitudinally thereof arranged between said bearings, one end of the cage having a shaft extended into one of said bearings, a cylinder having a bore tapered to correspond to the taper of the conical cage surrounding the cage, a brake associated with the cylinder for controlling rotation thereof, the smaller end of the cage and the shaft having a bore, a second shaft rotatably mounted in the other of said bearings and having a reduced extension rotatable and slidable within said bore, a cone secured to said shaft and directly engageable with the rollers of the cage at the inner face of the cage, an end bell for the larger end of the cage, a second cage secured to said end bell and having rollers, said second cage projecting into the first cage, a ring disposed between the rollers of the first and second named cages and engaging each thereof and a second cone carried by said shaft and engageable with the rollers of the second cage to drive the same, the last named cone being secured to a sleeve splined to said shaft.

In testimony that I claim the foregoing as my own I have hereto affixed my signature this 1st day of June, 1925.

DAVID L. McCLINTOCK.